US010419906B2

(12) United States Patent
Shaikh et al.

(10) Patent No.: US 10,419,906 B2
(45) Date of Patent: Sep. 17, 2019

(54) SELF-LEARNING BLUETOOTH INFOTAINMENT CONNECTIVITY

(71) Applicant: Panasonic Automotive Systems Company of America, Division of Panasonic Corporation of North America, Peachtree City, GA (US)

(72) Inventors: Shaheer-Ahmed Shaikh, Farmington Hills, MI (US); Annamalai Paramasivam, Novi, MI (US)

(73) Assignee: Panasonic Automotive Systems Company of America, Division of Panasonic Corporation of North America, Peachtree, GA (US)

( * ) Notice: Subject to any disclaimer, the term of this patent is extended or adjusted under 35 U.S.C. 154(b) by 0 days.

(21) Appl. No.: 16/120,766

(22) Filed: Sep. 4, 2018

(65) Prior Publication Data

US 2019/0075437 A1 Mar. 7, 2019

Related U.S. Application Data

(60) Provisional application No. 62/554,065, filed on Sep. 5, 2017.

(51) Int. Cl.
| | |
|---|---|
| *H04W 4/48* | (2018.01) |
| *H04W 76/11* | (2018.01) |
| *H04M 1/725* | (2006.01) |
| *H04W 8/18* | (2009.01) |
| *H04W 8/00* | (2009.01) |
| *H04M 1/60* | (2006.01) |
| *G06N 20/00* | (2019.01) |

(52) U.S. Cl.
CPC ........... *H04W 4/48* (2018.02); *H04M 1/6091* (2013.01); *H04M 1/7253* (2013.01); *H04W 8/005* (2013.01); *H04W 8/183* (2013.01); *H04W 76/11* (2018.02); *G06N 20/00* (2019.01); *H04M 2250/02* (2013.01)

(58) Field of Classification Search
CPC ..... H04W 4/48; H04W 8/005; H04M 1/6091; H04M 1/7253; H04M 2250/02; G06N 20/00
See application file for complete search history.

(56) References Cited

U.S. PATENT DOCUMENTS

| | | | | |
|---|---|---|---|---|
| 2015/0304473 | A1* | 10/2015 | Moeller | H04L 67/12 455/426.1 |
| 2016/0007140 | A1* | 1/2016 | Yae | H04M 1/7253 455/41.2 |
| 2016/0241645 | A1* | 8/2016 | Sabbaghian | H04L 67/12 |
| 2018/0170231 | A1* | 6/2018 | Song | B60N 2/976 |

* cited by examiner

*Primary Examiner* — Ayodeji O Ayotunde
(74) *Attorney, Agent, or Firm* — Laurence S. Roach, Esq.

(57) ABSTRACT

A wireless connectivity arrangement for an infotainment system of a motor vehicle includes a user profile manager storing associations between users of the motor vehicle and respective personal electronic devices. A wireless connection manager is communicatively coupled to the user profile manager. The wireless connection manager detects that a personal electronic device is in a vicinity of the vehicle, and refers to the user profile manager to determine whether the personal electronic device is a primary personal electronic device of a current user of the vehicle.

20 Claims, 3 Drawing Sheets

SELF-LEARNING BLUETOOTH INFOTAINMENT CONNECTIVITY

CROSS-REFERENCE TO RELATED APPLICATION

This application claims benefit of U.S. Provisional Application No. 62/554,065 filed on Sep. 5, 2017, which the disclosure of which is hereby incorporated by reference in its entirety for all purposes.

FIELD OF THE INVENTION

The disclosure relates to an infotainment system in a motor vehicle.

BACKGROUND OF THE INVENTION

Current personal electronic devices and infotainment head units get connected if they have been paired previously, without paying attention to a different user preference. If a device and a head unit are close to each other, then they automatically get connected, sometimes overriding existing connections. Self-learning Bluetooth infotainment connectivity does not exist on current systems. As currently there is growing need for multiple device connectivity and on different protocols/profiles with Bluetooth interface, there is consequently the need for self-learning Bluetooth infotainment connectivity.

Current systems basically have few rules defined, and may allow a maximum of two devices to be connected at a time. One device may be for audio and the other device may be for telephone.

The priority of using a Bluetooth interface for using apps from devices and allowing audio/phone connections while using Android auto/Apple Car-play are very scarcely defined and more often than not lead to ambiguous connections. More precisely, sometimes Bluetooth devices that are in the vicinity of the car get connected to the car although the devices are not being used by any of the vehicle occupants. This results in inadvertent connection and results in a poor user experience. For example, a user may be in an active call at his residence but may experience an audio blackout in his cellphone because the audio gets transferred to the vehicle when the vehicle is operated by a different user.

The key flow areas of current systems may include biometric technologies including fingerprinting and facial recognition, which are being used in the cars to identify drivers.

The key flow areas of current systems may also include automotive head units maintaining a list of Bluetooth devices that have been paired. The head unit connects to one of the paired devices that is in the vicinity. The user has an option to specify one of the devices as a favorite device. When there is only one paired device in the vicinity, the head unit connects to that device. When there is more than one paired device in the vicinity, the head unit connects to the favorite device if it is available, or connects to one of the devices based on an internal priority mechanism, such as a list of the order of paired devices, etc.

Yet another key flow area of current systems includes supporting a menu option where the user can go and view the paired device list. This menu also allows user to change the connection to a different Bluetooth device that is available in the vicinity of the car.

Bluetooth stacks developed by different companies adhering to Bluetooth protocols are available. Companies develop proprietary software on top of these Bluetooth stacks to provide needed functionalities.

With Bluetooth connectivity being readily available, there is no guarantee, which might override other connections, that a user will go into the settings of each device and explicitly define Bluetooth profile connections for the same. But, most importantly, in the case of a hands-free profile, there are observations which override current active Bluetooth-phone connections and allow for connection of another phone/device without regard for priority or preference. This lack of regard for priority or preference makes it very frustrating and annoying to use the feature with multiple devices.

SUMMARY

The present invention may provide self-learning phone Bluetooth connectivity with automotive infotainment head units.

The present invention may learn and adapt to individuals' requests for Bluetooth connections of various purposes, but especially for hands-free profile connections from different devices which may be strictly tied up with specific user profile preferences. In order to achieve this, the system may record every connection made with a specific device and also keep a count of the connection requests. The system may also hold the user profile preferred device at all times so as to compare the incoming connection requests against the user profile preferred device and build a history of the user profile preferred device. Based on historical data and the user profile preferred device, the system may suggest the user for profile preference update.

Noteworthy are the media access control (MAC) identification of a device and the profile type of the connection request for recording/storing the historical data. Updating the user profile preference based on historical data may prevent the system from making connections that are unwanted by the user, or may enable the system to override the connections. The system may inform the user of such incoming connections which have not been recorded before and which are not part of the user profile preference device.

The present invention may "learn" and associate the identification of a paired phone with the identification of the current driver. The user interface may be modified to facilitate this learning process. The active driver identification of each device in the paired device list may be maintained.

The phone identification that is associated with the identification of the current driver may be reviewed before deciding which paired phone the vehicle system needs to connect to. In addition, the user interface may facilitate the learning process wherein the head unit can learn the device identification that is associated with the driver.

The automotive head unit may connect the Bluetooth device whose identification is associated with the identification of the current driver. If a Bluetooth device with an identification that is not associated with the identification of the current driver is detected, the system may prompt the user to indicate whether he wants to go ahead with the connection. This may ensure that the audio of a phone that is not in the car does not get abruptly transferred to the car. In addition, the driver also may have an option to associate this phone identification with the identification of the current driver if he chooses to. The response of the user can be stored in the database for further learning.

If no phones in the paired device list of the vehicle are associated with the identification of the current driver and one of the paired devices on the list is detected in the vicinity of the car, the user may be prompted to associate the identification of the device with the identification of the current driver prior to establishing the connection. Whenever the user tries to select a different phone, the user interface may provide the option to associate the identification of the phone with the identification of the currently active driver.

In one embodiment, the invention comprises a wireless connectivity arrangement for an infotainment system of a motor vehicle, including a user profile manager storing associations between users of the motor vehicle and respective personal electronic devices. A wireless connection manager is communicatively coupled to the user profile manager. The wireless connection manager detects that a personal electronic device is in a vicinity of the vehicle, and refers to the user profile manager to determine whether the personal electronic device is a primary personal electronic device of a current user of the vehicle. If it is determined that the personal electronic device is a primary personal electronic device of a current user of the vehicle, then the wireless connection manager automatically establishes a wireless connection between the personal electronic devices and the vehicle. If it is determined that the personal electronic device is not a primary personal electronic device of a current user of the vehicle, then the wireless connection manager responds to a command from the user by establishing a wireless connection between the personal electronic device and the vehicle, and identifying the personal electronic device as a primary personal electronic device of the current user in the user profile manager.

In another embodiment, the invention comprises a wireless connectivity method for an infotainment system of a motor vehicle, including storing associations between users of the motor vehicle and respective personal electronic devices. It is detected that a personal electronic device is in a vicinity of the vehicle. It is determined whether the personal electronic device is a primary personal electronic device of a current user of the vehicle. If it is determined that the personal electronic device is a primary personal electronic device of a current user of the vehicle, a wireless connection between the personal electronic devices and the vehicle is automatically established. If it is determined that the personal electronic device is not a primary personal electronic device of a current user of the vehicle, a command from the user is responded to by establishing a wireless connection between the personal electronic device and the vehicle, and storing in memory an identification of the personal electronic device as a primary personal electronic device of the current user.

In yet another embodiment, the invention comprises a wireless connectivity arrangement for an infotainment system of a motor vehicle. The arrangement includes a user profile manager storing associations between users of the motor vehicle and respective personal electronic devices. A wireless connection history manager stores identifications of ones of the personal electronic devices that have been previously wirelessly connected to the vehicle. A wireless connection manager is communicatively coupled to the user profile manager and to the wireless connection history manager. The wireless connection manager detects that a personal electronic device is near or in the vehicle. The wireless connection manager refers to the user profile manager to determine whether the personal electronic device is a primary personal electronic device of a current user of the vehicle. If it is determined that the personal electronic device is a primary personal electronic device of a current user of the vehicle, the wireless connection manager automatically wirelessly connects the personal electronic devices and the vehicle. If it is determined that the personal electronic device is not a primary personal electronic device of a current user of the vehicle, and if a first command is received from the user, the wireless connection manager responds to the first command from the user by wirelessly connecting the personal electronic device and the vehicle, and by identifying the personal electronic device as a primary personal electronic device of the current user in the user profile manager. If it is determined that the personal electronic device is not a primary personal electronic device of a current user of the vehicle, and if a second command is received from the user, the wireless connection manager responds to the second command from the user by wirelessly connecting the personal electronic device and the vehicle, and refraining from identifying the personal electronic device as a primary personal electronic device of the current user in the user profile manager.

An advantage of the present invention is that it may help avoid the struggle of telephones being inadvertently connected with infotainment head units. By introducing self-learning, a personal electronic device can be associated with a user identification, and that relationship may be kept active. However, an incoming connection request may not be granted, and the user may not be informed of the incoming connection request.

Another advantage of the present invention is that it can be ideally integrated on top of Bluetooth stacks, providing much control in defining user preferences.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
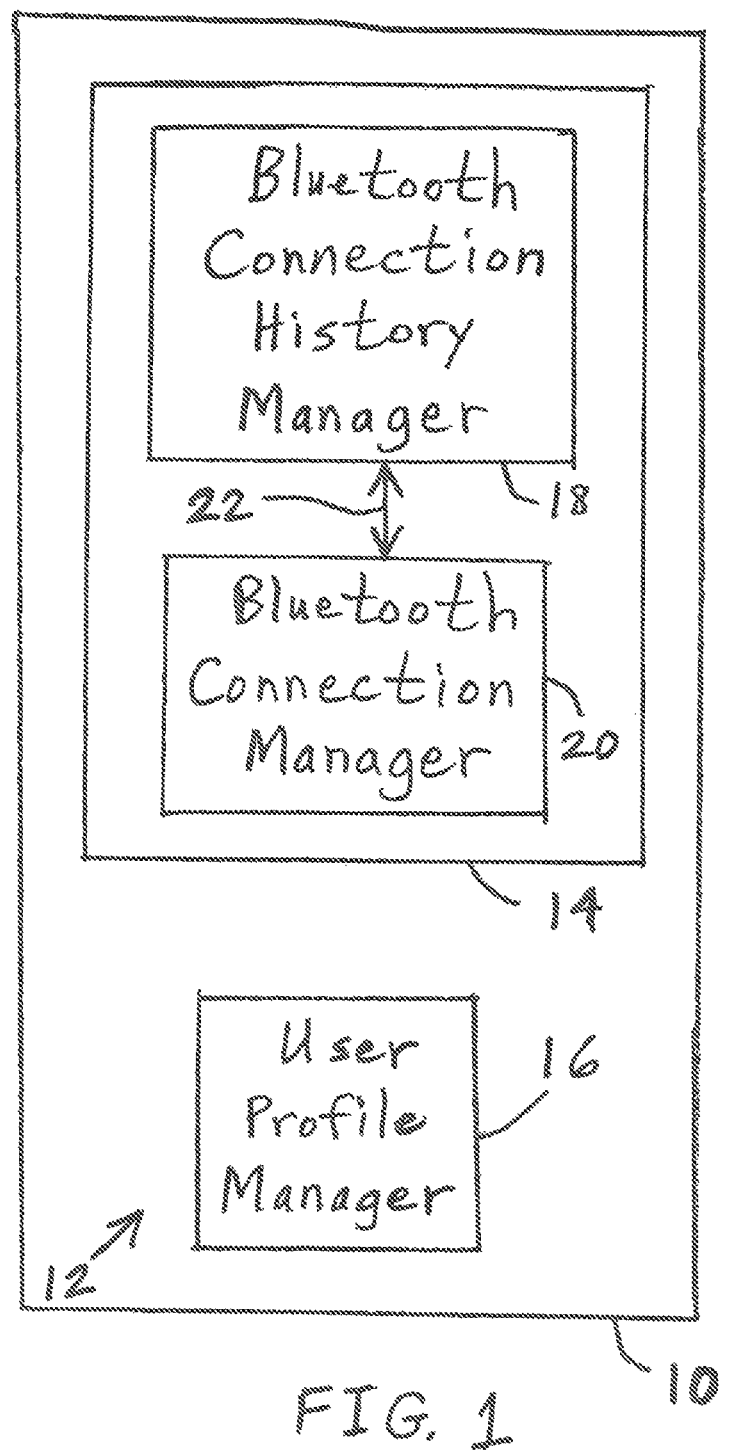
FIG. 1 is a block diagram of one example embodiment of a Bluetooth connectivity arrangement of the present invention for an infotainment system of a motor vehicle.

FIG. 1 illustrates one example embodiment of a motor vehicle 10 including a Bluetooth connectivity arrangement 12 of the present invention. Arrangement 12 includes an infotainment system 14 and a user profile manager 16. Infotainment system 14 includes a Bluetooth connection history manager 18 and a Bluetooth connection manager 20 which may communicate with each other via Bluetooth service, as indicated at 22. Bluetooth connection history manager 18 may record the number of phone/audio/other connections per device and per profile, and may store an identification of the preferred/primary device.

Figure 2:
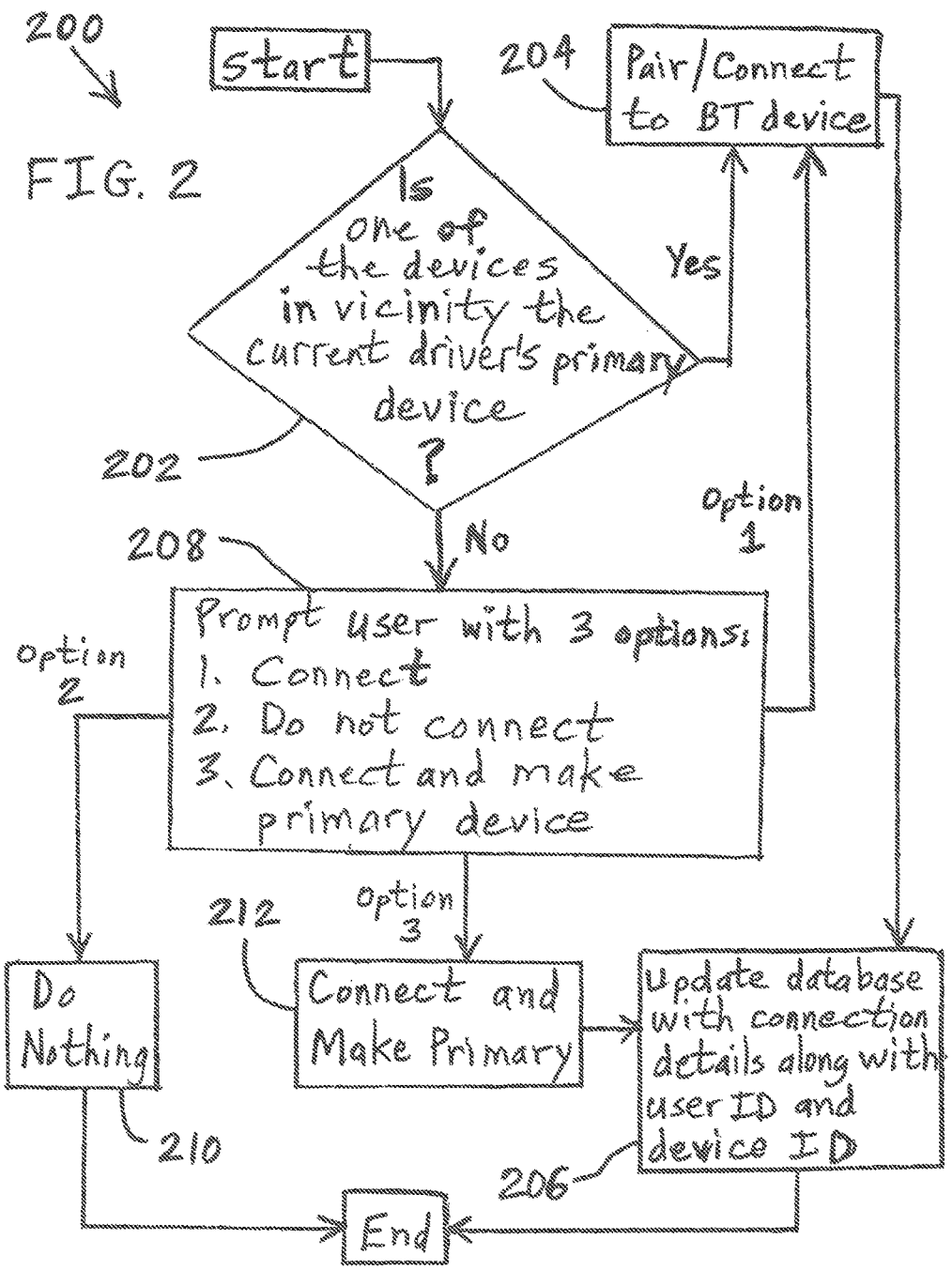
FIG. 2 is a flow chart of one example embodiment of a Bluetooth connectivity method of the present invention for an infotainment system of a motor vehicle.

FIG. 2 is a flow chart of one example embodiment of a Bluetooth connectivity method 200 of the present invention for an infotainment system of a motor vehicle. In a first step 202, it is determined whether one of the devices determined to be nearby the vehicular infotainment system is the current driver's primary personal electronic device. If so, then in step 204 the current driver's primary device is paired with, or connected to, the Bluetooth device. Next, in step 206, a database is updated with connection details along with an identification of the user and an identification of the current driver's primary device.

On the other hand, if it is determined in step 202 that none of the devices determined to be nearby the vehicular infotainment system is the current driver's primary personal electronic device, then in step 208 the user is presented with three options. A first option is to make a Bluetooth connection between a device that is near or in the vehicle and the vehicle itself. A second option is to not make a connection between the device and the vehicle. The third option is to make the connection between the device and the vehicle and to make or regard the device as the driver's primary personal electronic device.

If the user chooses option 1, then operation proceeds to step 204 et al., as described above. If the user chooses option 2, then operation proceeds to step 210 where no action is taken. If the user chooses option 3, then operation proceeds to step 212 wherein a Bluetooth connection is made between the device and the vehicle, and the device is made the driver's primary device. Operation then proceeds to step 206 as described above.

In an alternative embodiment, the unwanted connections may be manually connected/disconnected. Also, Bluetooth may be turned off on the device and trying to connect it back may be turned on.

Figure 3:
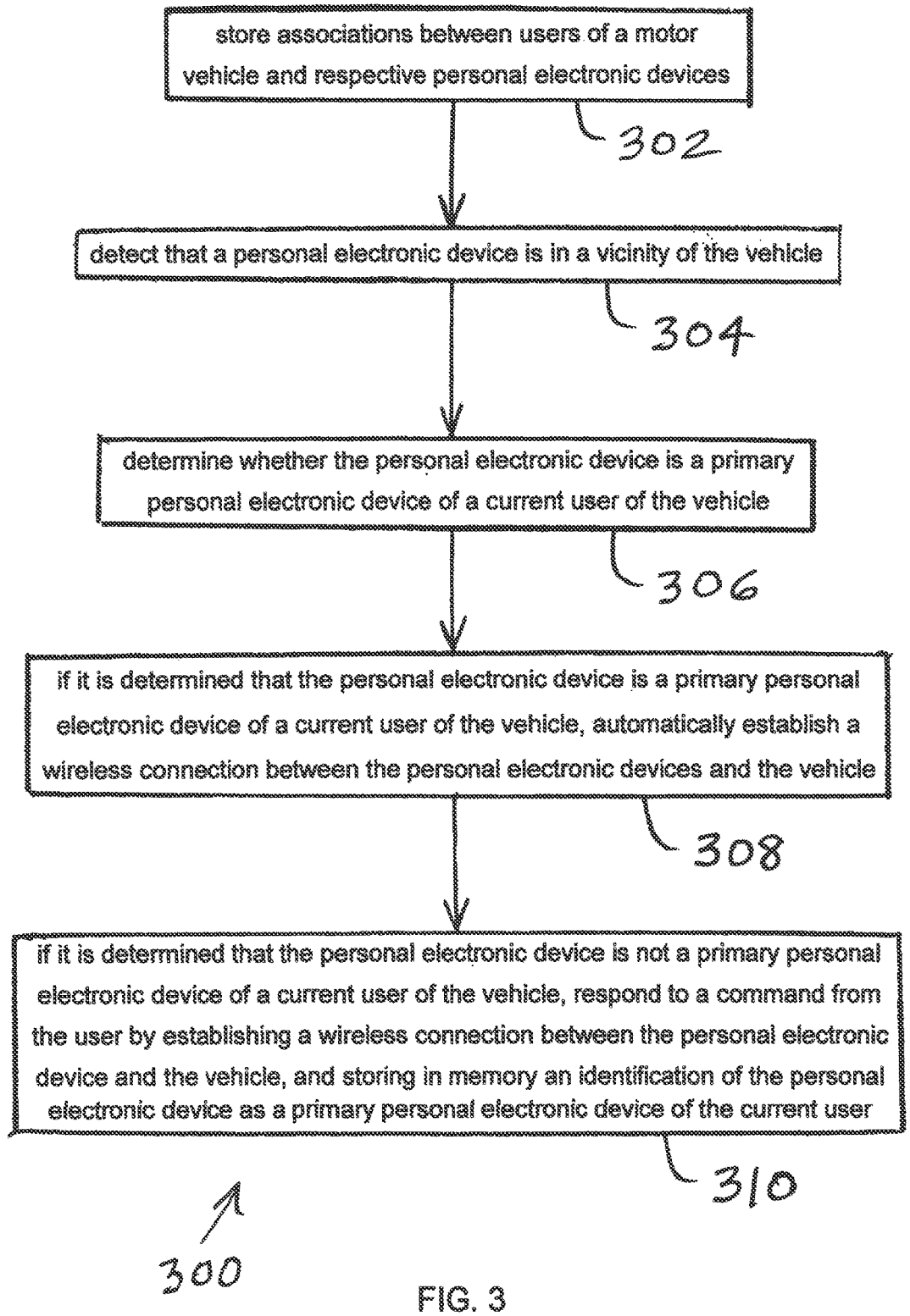
FIG. 3 is a flow chart of one example embodiment of a wireless connectivity method of the present invention for an infotainment system of a motor vehicle.

FIG. 3 illustrates of one example embodiment of a wireless connectivity method 300 for an infotainment system of a motor vehicle. In a first step 302, associations between users of the motor vehicle and respective personal electronic devices are stored. For example, Bluetooth connection history manager 18 may record identifications of users of motor vehicle 10 as well as an identification of each user's personal electronic devices.

In a next step 304, it is detected that a personal electronic device is in a vicinity of the vehicle. For example, it may be determined via Bluetooth technology that one of the devices is nearby the vehicular infotainment system.

Next, in step 306, it is determined whether the personal electronic device is a primary personal electronic device of a current user of the vehicle. For example, Bluetooth connection history manager 18 may be referred to in order to determine whether the personal electronic device is recorded therein as a primary personal electronic device of an identified current user of the vehicle.

In step 308, if it is determined that the personal electronic device is a primary personal electronic device of a current user of the vehicle, then a wireless connection between the personal electronic devices and the vehicle is automatically established. For example, as in step 204, the current driver's primary device maybe automatically paired with, or connected to, a Bluetooth device of motor vehicle 10.

In a final step 310, if it is determined that the personal electronic device is not a primary personal electronic device of a current user of the vehicle, then a command from the user is responded to by establishing a wireless connection between the personal electronic device and the vehicle, and storing in memory an identification of the personal electronic device as a primary personal electronic device of the current user. For example, Bluetooth connection history manager 18 may indicate that the personal electronic device is not recorded therein as a primary personal electronic device of the identified current user of the vehicle. In response to a command from the user to do so, the device maybe automatically paired with the Bluetooth device of motor vehicle 10. Also, an identification of the personal electronic device as a primary personal electronic device of the user may be stored in Bluetooth connection history manager 18.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A wireless connectivity arrangement for an infotainment system of a motor vehicle, the arrangement comprising:
   a user profile manager configured to store associations between users of the motor vehicle and respective personal electronic devices; and
   a wireless connection manager communicatively coupled to the user profile manager, the wireless connection manager being configured to:
      detect that a personal electronic device is in a vicinity of the vehicle;
      refer to the user profile manager to determine whether the personal electronic device is a primary personal electronic device of a current user of the vehicle;
      if it is determined that the personal electronic device is a primary personal electronic device of a current user of the vehicle, automatically establish a wireless connection between the personal electronic devices and the vehicle; and
      if it is determined that the personal electronic device is not a primary personal electronic device of a current user of the vehicle, respond to a command from the user by:
         establishing a wireless connection between the personal electronic device and the vehicle; and
         identifying the personal electronic device as a primary personal electronic device of the current user in the user profile manager.

2. The arrangement of claim 1 further comprising a wireless connection history manager communicatively coupled to the wireless connection manager and configured to store identifications of ones of the personal electronic devices that have been previously wirelessly connected to the vehicle.

3. The arrangement of claim 2 wherein the wireless connection history manager is configured to store times at which the personal electronic device has been previously wirelessly connected to the vehicle.

4. The arrangement of claim 1 wherein the wireless connection manager is configured to, if it is determined that the personal electronic device is not a primary personal electronic device of a current user of the vehicle, respond to a command from the user by storing within the user profile manager an association between the personal electronic device and the current user, wherein the association identifies the personal electronic device as the user's primary personal electronic device.

5. The arrangement of claim 4 wherein the association includes an identification of the personal electronic device and an identification of the user.

6. The arrangement of claim 1 wherein the command from the user comprises a command to make the wireless connection, the wireless connection manager being configured to respond to a command from the user to not make the connection by not making the connection.

7. The arrangement of claim 1 wherein the current user of the vehicle is a current driver of the vehicle.

8. A wireless connectivity method for an infotainment system of a motor vehicle, the method comprising:
storing associations between users of the motor vehicle and respective personal electronic devices;
detecting that a personal electronic device is in a vicinity of the vehicle;
determining whether the personal electronic device is a primary personal electronic device of a current user of the vehicle;
if it is determined that the personal electronic device is a primary personal electronic device of a current user of the vehicle, automatically establishing a wireless connection between the personal electronic devices and the vehicle; and
if it is determined that the personal electronic device is not a primary personal electronic device of a current user of the vehicle, responding to a command from the user by:
establishing a wireless connection between the personal electronic device and the vehicle; and
storing in memory an identification of the personal electronic device as a primary personal electronic device of the current user.

9. The method of claim 8 further comprising storing in memory identifications of ones of the personal electronic devices that have been previously wirelessly connected to the vehicle.

10. The method of claim 9 further comprising storing in memory times at which the personal electronic device has been previously wirelessly connected to the vehicle.

11. The method of claim 8 wherein, if it is determined that the personal electronic device is not a primary personal electronic device of a current user of the vehicle, a command from the user is responded to by storing in memory an association between the personal electronic device and the current user, wherein the association identifies the personal electronic device as the user's primary personal electronic device.

12. The method of claim 11 wherein the association includes an identification of the personal electronic device and an identification of the user.

13. The method of claim 8 wherein the command from the user comprises a command to make the wireless connection, the method further comprising responding to a command from the user to not make the connection by not making the connection.

14. The method of claim 8 wherein the current user of the vehicle is a current driver of the vehicle.

15. A wireless connectivity arrangement for an infotainment system of a motor vehicle, the arrangement comprising:
a user profile manager configured to store associations between users of the motor vehicle and respective personal electronic devices;
a wireless connection history manager configured to store identifications of ones of the personal electronic devices that have been previously wirelessly connected to the vehicle; and
a wireless connection manager communicatively coupled to the user profile manager and the wireless connection history manager, the wireless connection manager being configured to:
detect that a personal electronic device is near or in the vehicle;
refer to the user profile manager to determine whether the personal electronic device is a primary personal electronic device of a current user of the vehicle;
if it is determined that the personal electronic device is a primary personal electronic device of a current user of the vehicle, automatically wirelessly connect the personal electronic devices and the vehicle;
if it is determined that the personal electronic device is not a primary personal electronic device of a current user of the vehicle, and if a first command is received from the user, respond to the first command from the user by:
wirelessly connecting the personal electronic device and the vehicle; and
identifying the personal electronic device as a primary personal electronic device of the current user in the user profile manager, and
if it is determined that the personal electronic device is not a primary personal electronic device of a current user of the vehicle, and if a second command is received from the user, respond to the second command from the user by:
wirelessly connecting the personal electronic device and the vehicle; and
refrain from identifying the personal electronic device as a primary personal electronic device of the current user in the user profile manager.

16. The arrangement of claim 15 wherein the wireless connection history manager is configured to store times at which the personal electronic device has been previously wirelessly connected to the vehicle.

17. The arrangement of claim 15 wherein the wireless connection manager is configured to, if it is determined that the personal electronic device is not a primary personal electronic device of a current user of the vehicle, respond to the first command from the user by storing within the user profile manager an association between the personal electronic device and the current user, wherein the association identifies the personal electronic device as the user's primary personal electronic device.

18. The arrangement of claim 17 wherein the association includes an identification of the personal electronic device and an identification of the user.

19. The arrangement of claim 15 wherein the wireless connection manager is configured to, if it is determined that the personal electronic device is not a primary personal electronic device of a current user of the vehicle, respond to a third command from the user by not making the connection between the personal electronic device and the vehicle.

20. The arrangement of claim 15 wherein the current user of the vehicle is a current driver of the vehicle.

* * * * *